United States Patent [19]

Tanaka

[11] 3,725,592

[45] Apr. 3, 1973

[54] AMPLITUDE QUANTIZED SIGNAL TRANSMISSION METHOD

[75] Inventor: Yutaka Tanaka, Tokyo, Japan

[73] Assignee: Matsushita Electric Industrial Co. Ltd., Osaka, Japan

[22] Filed: Dec. 13, 1971

[21] Appl. No.: 207,442

Related U.S. Application Data

[63] Continuation of Ser. No. 736,418, June 12, 1968, abandoned.

[30] Foreign Application Priority Data

June 13, 1967 Japan ................................42/38404
Apr. 30, 1968 Japan ................................43/29396

[52] U.S. Cl. ........................179/15.55 R, 178/DIG. 3
[51] Int. Cl. ............................................H04b 13/00
[58] Field of Search .......179/15.55 R, 15.55 T, 15 A, 179/15 AW, 15 BA, 15 BM, 15 BW; 178/DIG. 3

[56] References Cited

UNITED STATES PATENTS

| | | | |
|---|---|---|---|
| 3,144,609 | 8/1964 | Rumble | 179/15 AY |
| 3,261,920 | 7/1966 | Aaron | 179/15 |
| 3,337,691 | 8/1967 | Litchman | 179/15 A |
| 3,244,808 | 4/1966 | Roberts | 178/6 BW |
| 3,372,228 | 3/1968 | Law | 178/6 BW |
| 3,453,383 | 7/1969 | Schafer | 178/6 BW |

*Primary Examiner*—Kathleen H. Claffy
*Assistant Examiner*—Jon Bradford Leaheey
*Attorney*—Stevens, Davis, Miller and Mosher

[57] ABSTRACT

A signal transmission method which reduces the frequency band of a transmission channel by sampling the input signal, quantizing each sampled pulse, combining the quantized pulses into a group of pulses, combining the quantized pulses in each group into a single pulse the quantized amplitude of which is uniquely determined from the quantized amplitude of each component pulse. The signal transmission method is used for transmitting video, facsimile, audio, data or other similar signals characterized by a high density of information with sufficient recognizability at a comparatively slight cost of signal-noise ratio.

9 Claims, 44 Drawing Figures

FIG. 1a
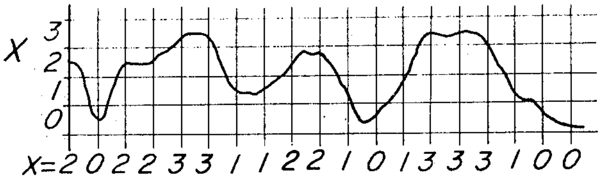
FIG. 1b
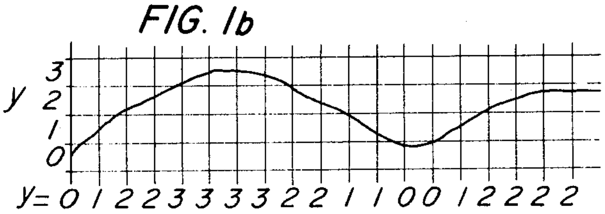
FIG. 1c
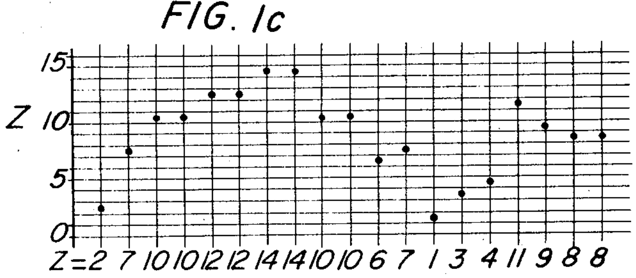
FIG. 2
| y \ X | 0 | 1 | 2 | 3 |
|---|---|---|---|---|
| 0 | 0 | 1 | 2 | 3 |
| 1 | 7 | 6 | 5 | 4 |
| 2 | 8 | 9 | 10 | 11 |
| 3 | 15 | 14 | 13 | 12 |
$Z=f(X,y)$
FIG. 3
| X | y | Z | Z' |
|---|---|---|---|
| 0 | 0 | 0 | 1 |
| 1 | 0 | 0 | 2 |
| 1 | 1 | 0 | 3 |
| 1 | 1 | 1 | 4 |
$Z'=f(X,y,Z)$
INVENTOR
YUTAKA TANAKA
BY Stevens, Davis, Miller & Mosher
ATTORNEYS

INVENTOR

YUTAKA TANAKA

BY Stevens, Davis, Miller & Mosher

ATTORNEYS

| b \ a | 0 | 1 | 2 | 3 | 4 | 5 |
|---|---|---|---|---|---|---|
| 0 | 0 | 1 | 2 | 3 | 4 | 5 |
| 1 | 6 | 7 | 8 | 9 | 10 | 11 |
| 2 | 17 | 16 | 15 | 14 | 13 | 12 |
| 3 | 18 | 19 | 20 | 21 | 22 | 23 |
| 4 | 29 | 28 | 27 | 26 | 25 | 24 |
| 5 | 30 | 31 | 32 | 33 | 34 | 35 |

$= \bar{Z}_1$

| $X_1$ | | | $\bar{Z}_1$ |
|---|---|---|---|
| $\bar{a}_i$ | $\bar{b}_i$ | $\bar{c}_i$ | |
| 0 | 0 | 0 | 0 |
| 1 | 0 | 0 | 1 |
| 1 | 1 | 0 | 2 |
| 0 | 1 | 0 | 3 |
| 0 | 1 | 1 | 4 |
| 0 | 0 | 1 | 5 |
| 1 | 0 | 1 | 6 |
| 1 | 1 | 1 | 7 |

INVENTOR

YUTAKA TANAKA

BY Stevens, Davis, Miller & Mosher

ATTORNEYS

| $y_2$ \ $x_2$ | 0 | 1 | 2 | 3 |
|---|---|---|---|---|
| 0 | 0 | 1 | 2 | 3 |
| 1 | 7 | 6 | 5 | 4 |
| 2 | 8 | 9 | 10 | 11 |
| 3 | 15 | 14 | 13 | 12 |

$Z_2 = f(X_2 . Y_2)$

| $X_2$ | $Y_2$ | $Z_2'$ | $Z_2''$ |
|---|---|---|---|
| 0 | 0 | 0 | 1 |
| 1 | 0 | 0 | 2 |
| 1 | 1 | 0 | 3 |
| 1 | 1 | 1 | 4 |

$Z_2' = f(X_2 . Y_2 . Z_2)$

INVENTOR

YUTAKA TANAKA

BY

ATTORNEYS

INVENTOR
YUTAKA TANAKA

BY

ATTORNEYS

INVENTOR

YUTAKA TANAKA

BY

ATTORNEYS

INVENTOR
YUTAKA TANAKA
BY
ATTORNEYS

INVENTOR
YUTAKA TANAKA

BY Stevens, Davis, Miller & Mosher
ATTORNEYS

| S2 \ S1 | 0 | 1 |
|---|---|---|
| 0 | 0 | 2 |
| 1 | 1 | 3 |

INVENTOR
YUTAKA TANAKA

BY Stevens, Davis, Miller & Mosher

ATTORNEYS

INVENTOR
YUTAKA TANAKA

BY

ATTORNEYS

INVENTOR
YUTAKA TANAKA

BY Stevens, Davis, Miller & Mosher

ATTORNEYS

FIG. 26
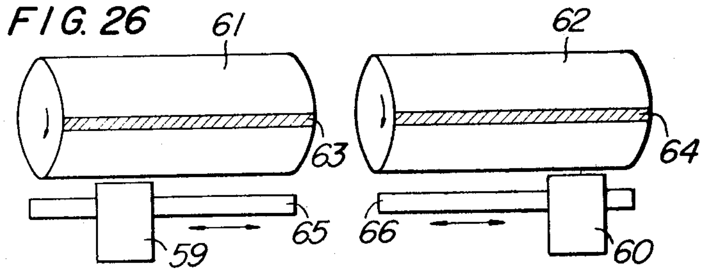
FIG. 27
| | | | | | | | | |
|---|---|---|---|---|---|---|---|---|
| A | 0 | 1 | 0 | 1 | 0 | 1 | 0 | 1 |
| B | 0 | 0 | 1 | 1 | 0 | 0 | 1 | 1 |
| C | 0 | 0 | 0 | 0 | 1 | 1 | 1 | 1 |
| D | 0 | 1 | 2 | 3 | 4 | 5 | 6 | 7 |
FIG. 28
| B \ A | 0 | 1 | 2 |
|---|---|---|---|
| 0 | 0 | 1 | 2 |
| 1 | 5 | 4 | 3 |
| 2 | 6 | 7 | 8 |
FIG. 29
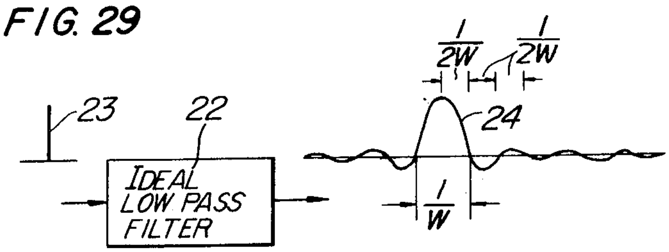
INVENTOR
YUTAKA TANAKA
BY Stevens, Davis, Miller & Mosher
ATTORNEYS

INVENTOR

YUTAKA TANAKA

BY Stevens, Davis, Miller & Mosher

ATTORNEYS

INVENTOR
YUTAKA TANAKA

BY Stevens, Davis, Miller & Mosher

ATTORNEYS

AMPLITUDE QUANTIZED SIGNAL TRANSMISSION METHOD

This is a continuation of application Ser. No. 736,418, filed June 12, 1968.

This invention relates to a method for transmitting electric signals.

An object of this invention is to provide a new signal transmission method capable of reducing the frequency band of a transmission channel by transmitting a converted signal having a narrower frequency band in lieu of the original signal to be transmitted, said converted signal being such that signal information $\overline{z}$ of said converted signal is determined by information $\overline{\alpha}_i$ ($i = 1, 2, 3 \ldots . l$), $\overline{\beta}_j$ ($j = 1, 2, 3 \ldots .. m$) and $\overline{\gamma}_k$ ($k = 1, 2, 3 \ldots .. n$) obtained by sampling said original signal, and inversely, the respective signal information $\overline{\alpha}_i$, $\overline{\beta}_j$ and $\overline{\gamma}_k$ is uniquely determined by the informations z of said converted signal.

The second object of this invention is to provide a method for transmitting plural sets of signal information through a transmission channel for a single signal.

The third object of this invention is to provide a method for transmitting a signal having a wide frequency band through a narrower channel after being compressed to a narrower frequency band.

This invention will be described hereunder in connection with embodiments of this invention referring to the attached drawing, in which:

FIGS. 1*a*, 1*b* and 1*c* show examples of wave forms of the signals to be transmitted according to a method embodying this invention;

FIGS. 2 and 3 are tables showing relation between informations contained in the signals shown in FIG. 1;

Figure 6A:
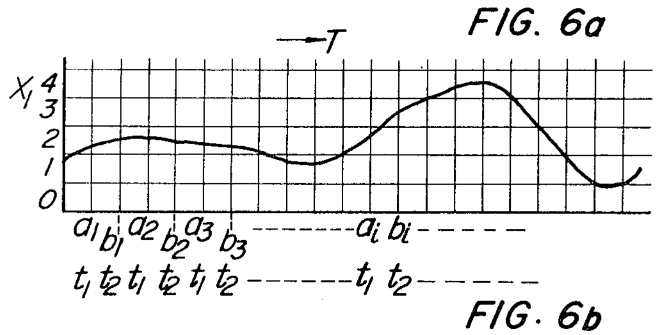
Figure 6B:
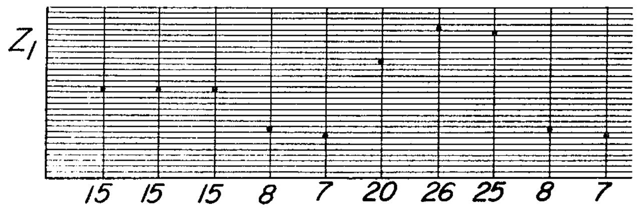
Figures 7, 8A, 8B, 9:
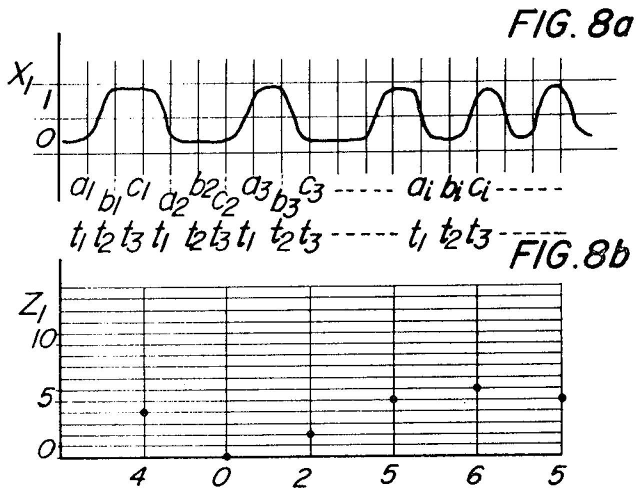
Figures 10, 13, 14:
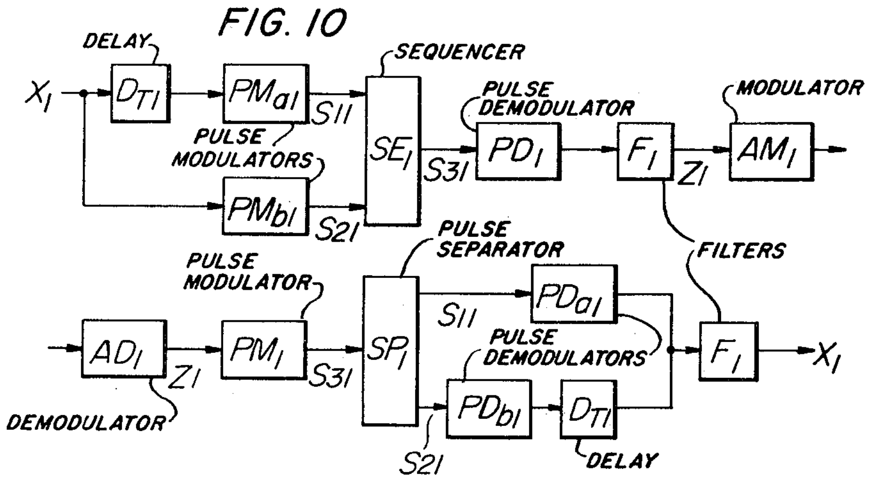
Figure 11:
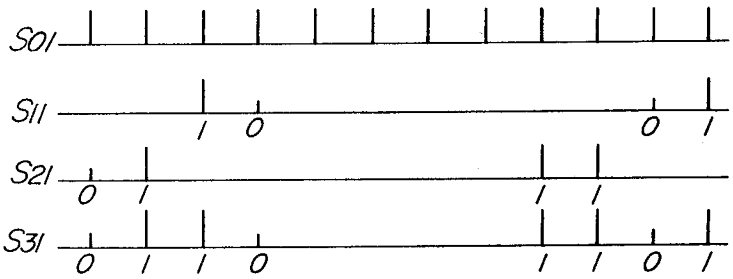
Figure 12A:
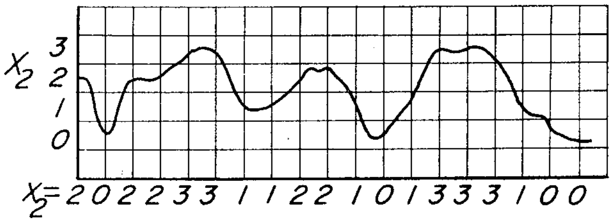
Figure 12B:
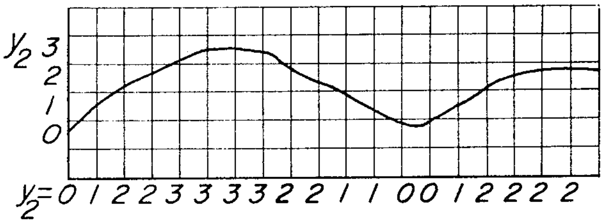
Figure 12C:
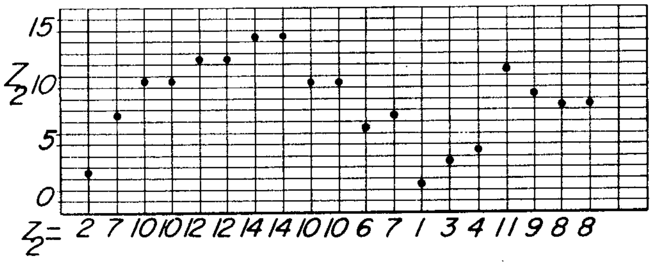
Figure 15:
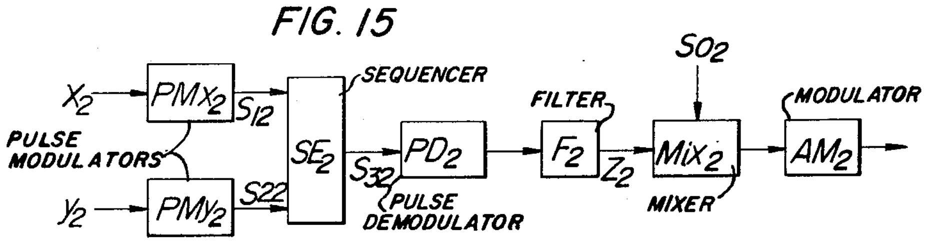
Figure 16:
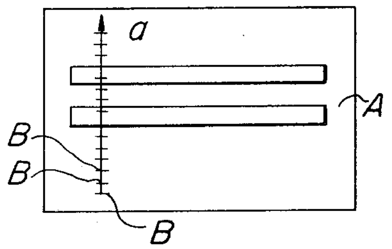
Figure 17A:
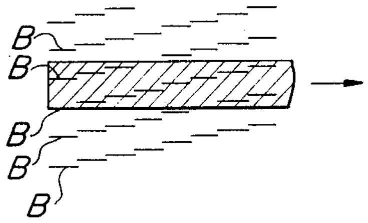
Figure 17B:
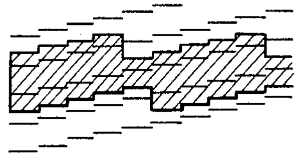
Figure 18A:
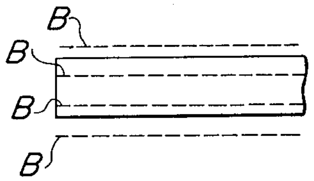
Figure 18B:
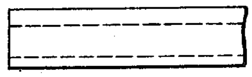
Figure 19:
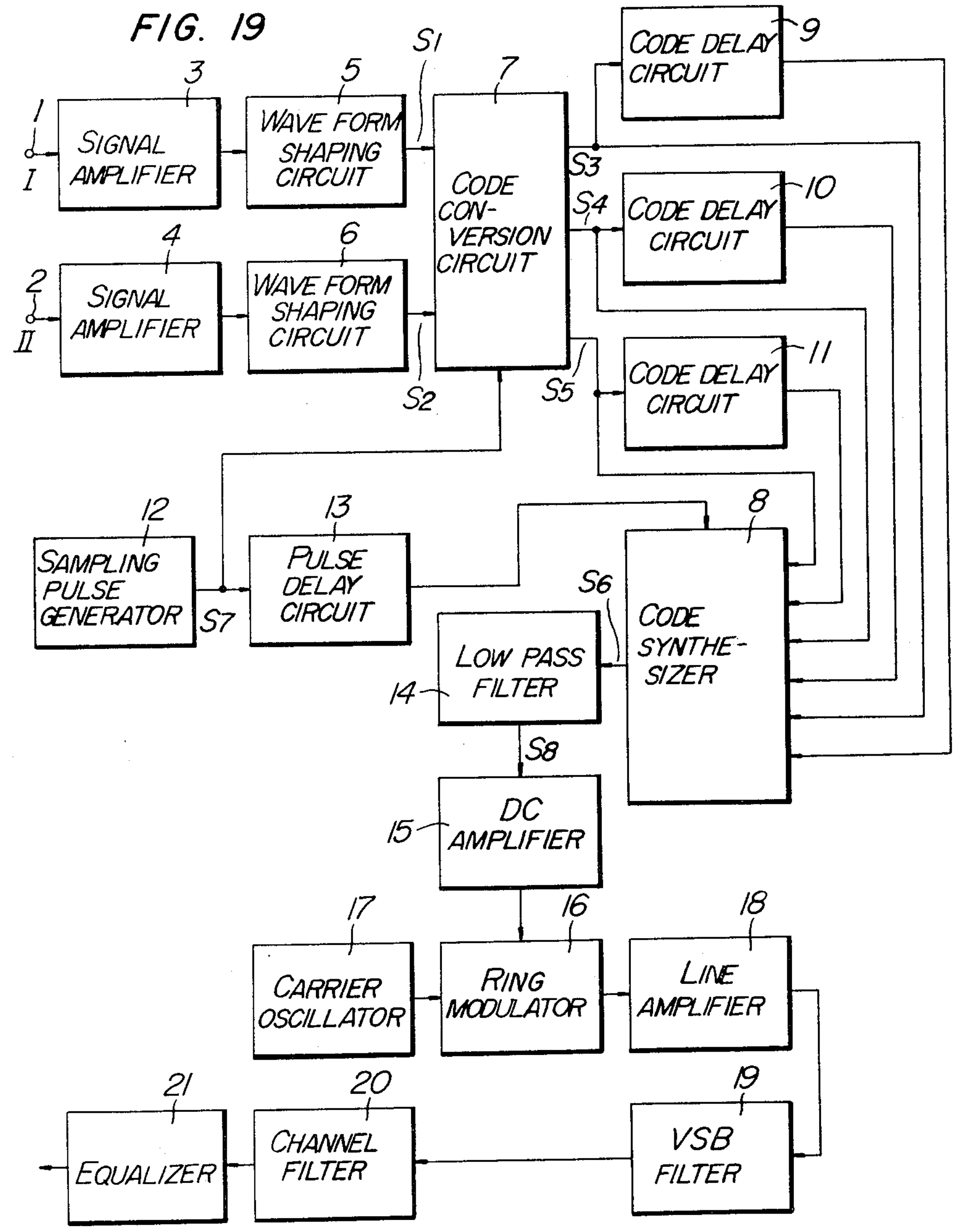
Figure 20:
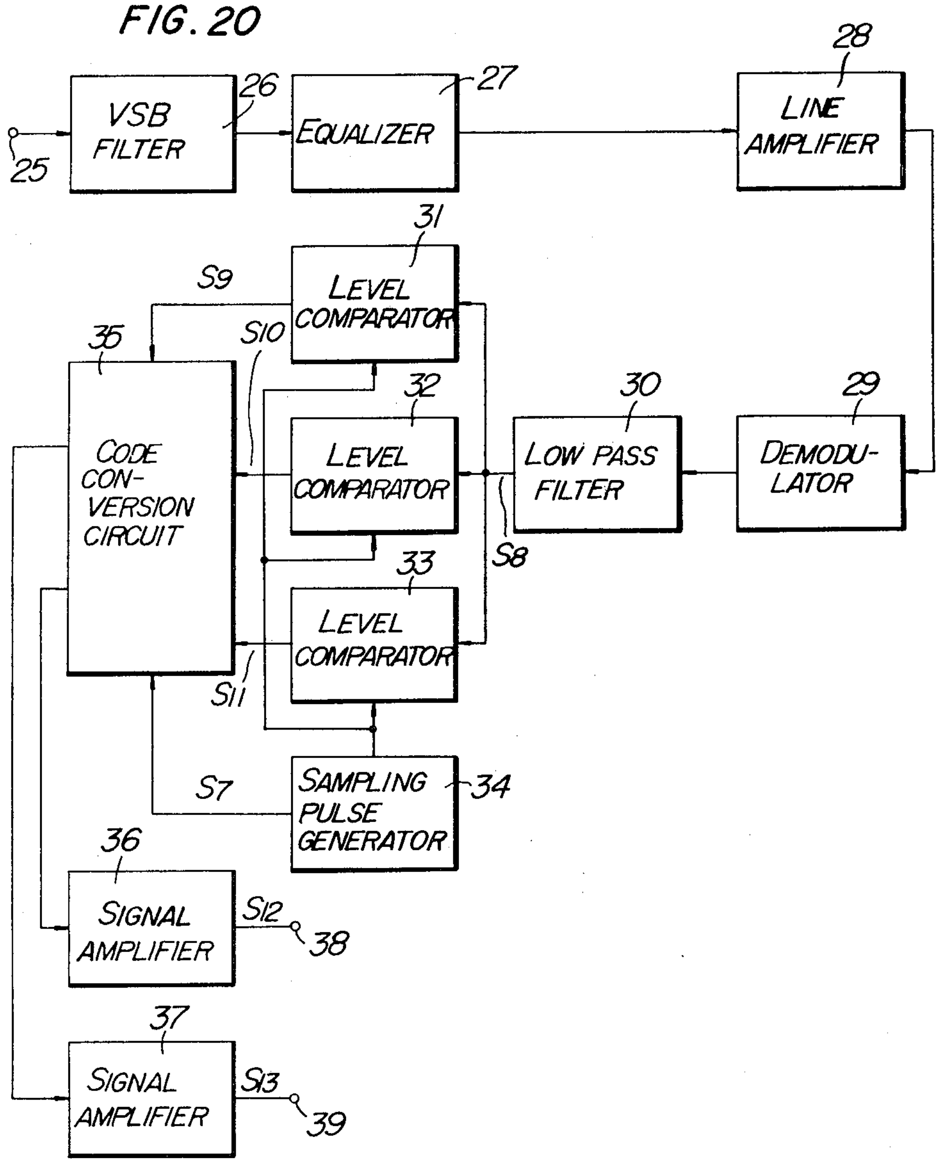
Figures 21, 22:
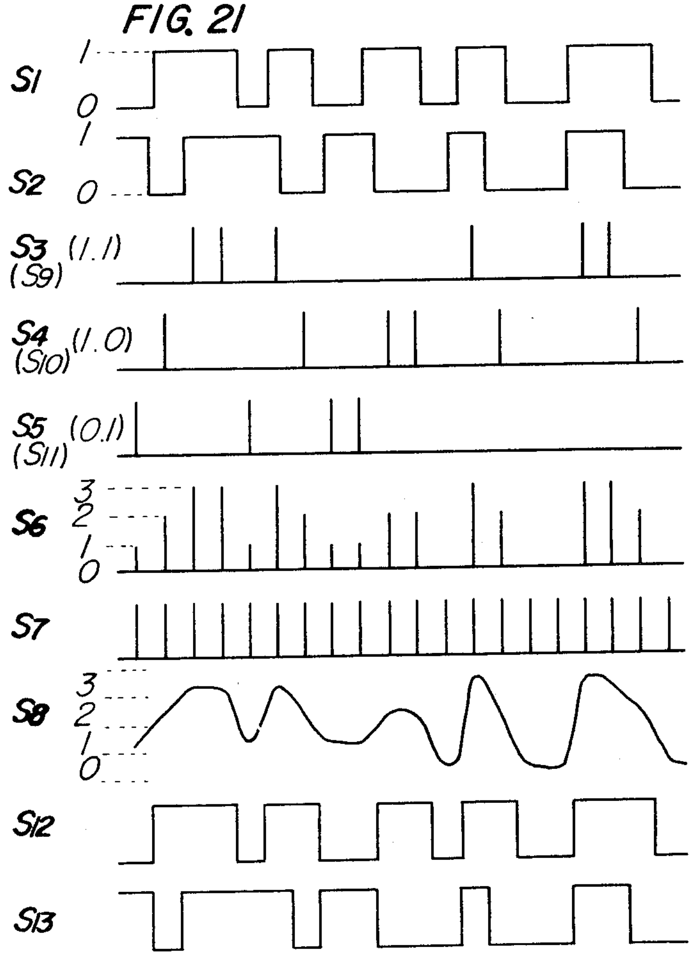
Figure 23:
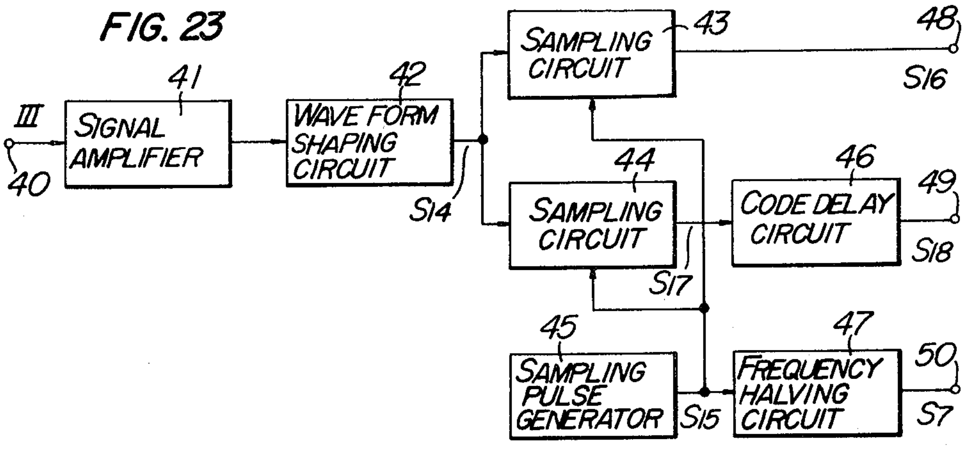
Figure 24:
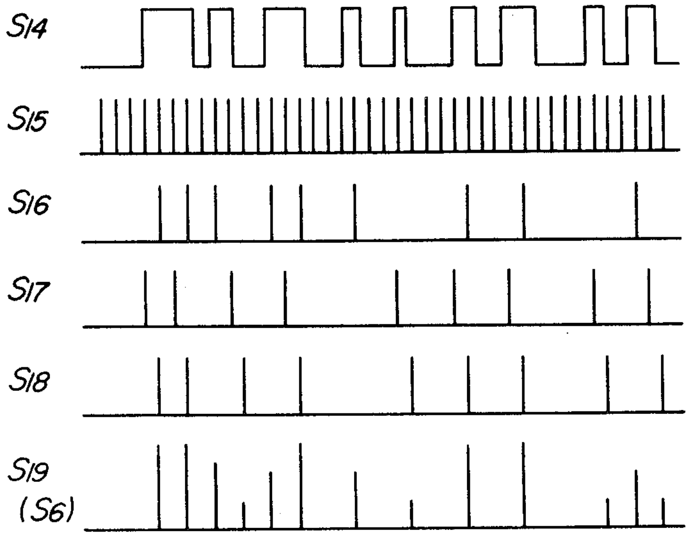
Figure 25:
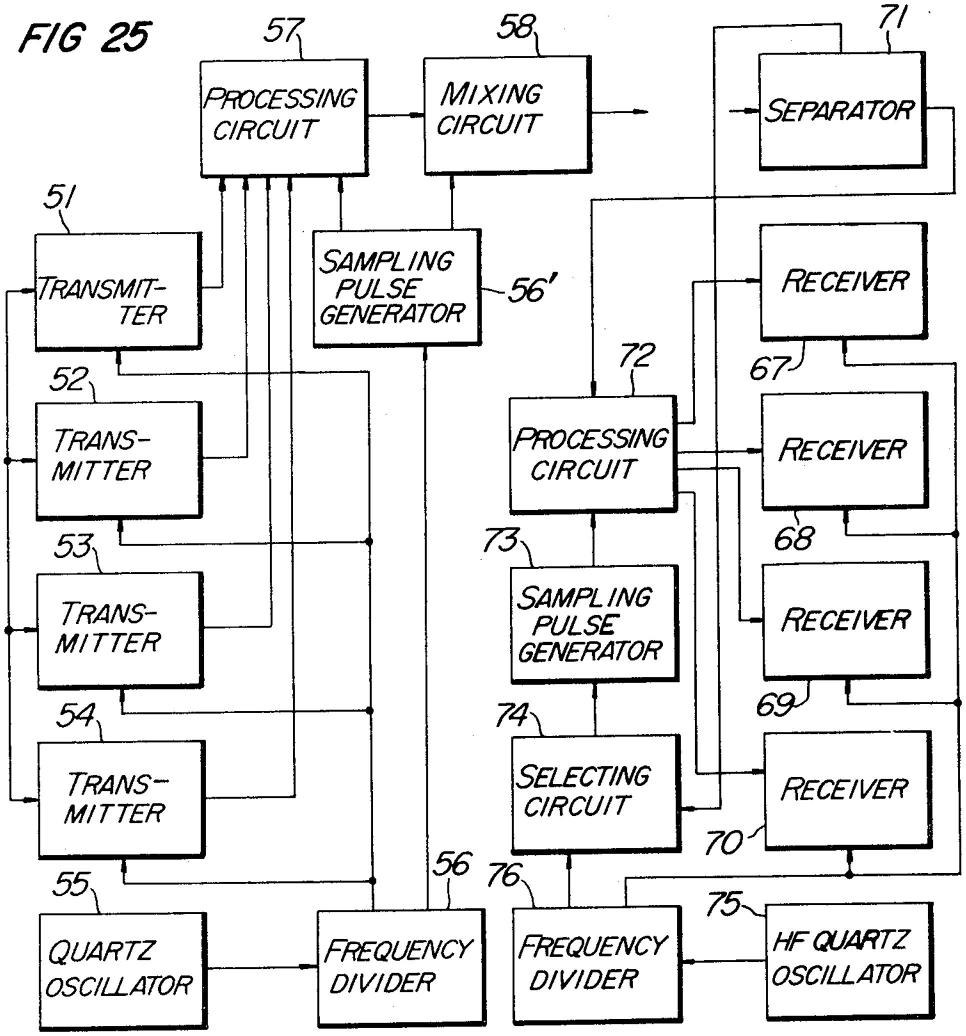
Figures 30, 31, 32, 33, 34, 35:
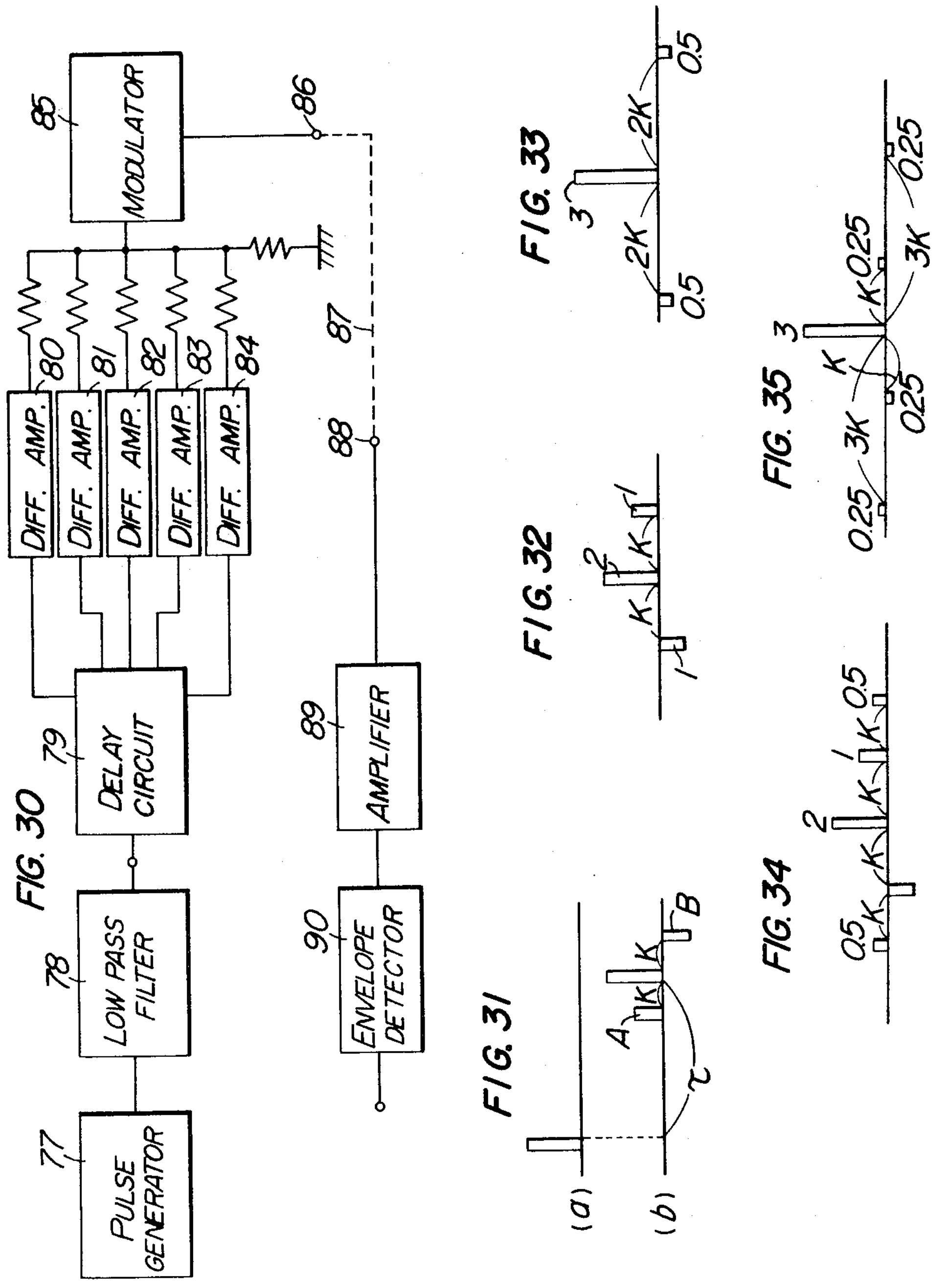
Figure 36:
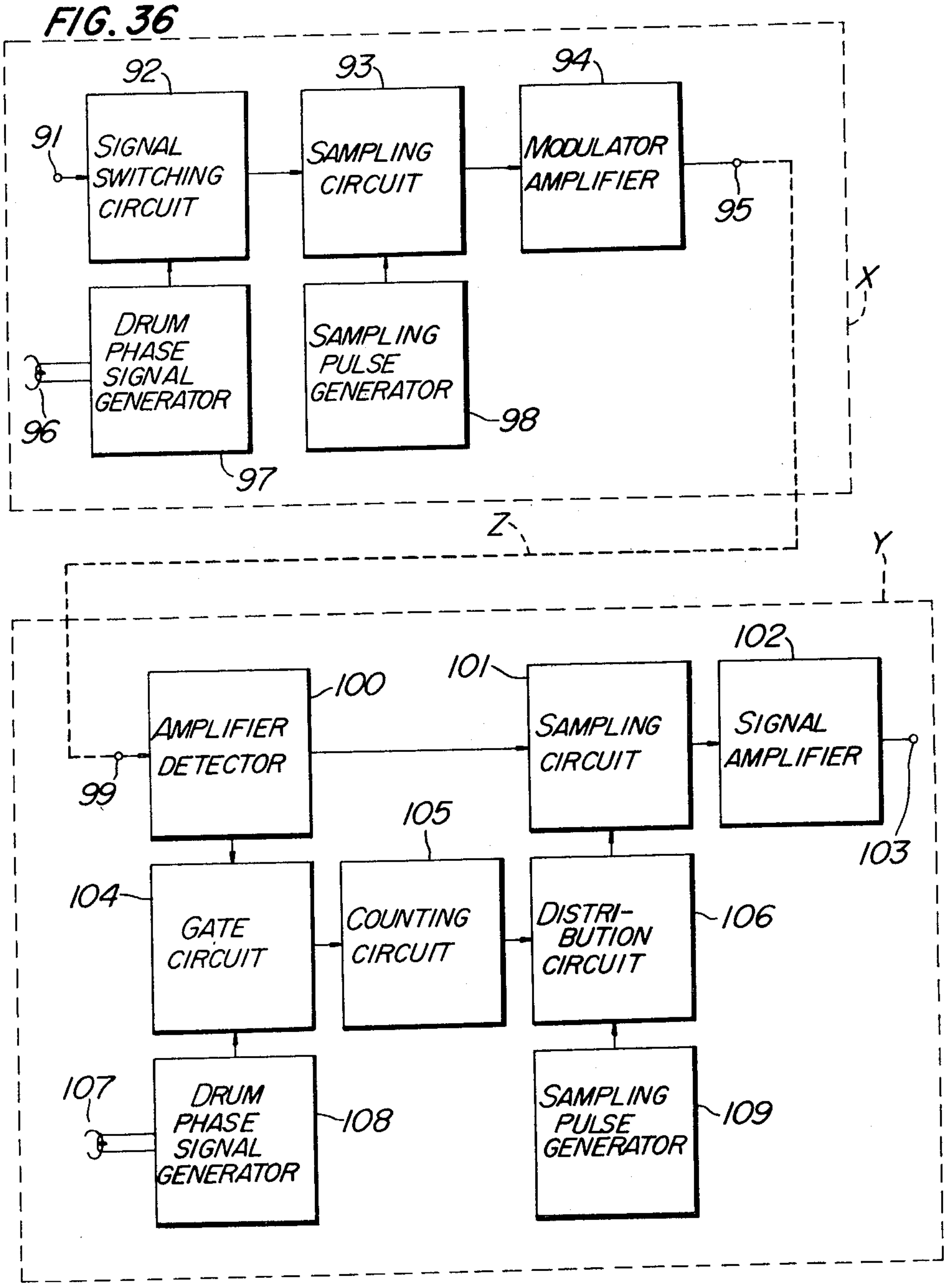

FIGS. 6*a* and 6*b* show an example of a wave form of the signal to be transmitted according to another embodiment of this invention;

FIG. 7 is a table showing relation between information contained in the signals shown in FIGS. 6*a* and 6*b*;

FIGS. 8*a* and 8*b* show a wave form of another signal to be transmitted according to this invention;

FIG. 9 is a table showing relation between information contained in the signals shown in FIGS. 8*a* and 8*b*;

FIG. 10 shows block diagrams of sending and receiving systems used in connection with the above embodiment;

FIG. 11 shows signals appearing at the indicated points of the systems shown in FIG. 10;

FIGS. 12*a*, 12*b* and 12*c* show wave forms of signals to be transmitted according to still another embodiment of this invention;

FIGS. 13 and 14 are tables showing relations between information contained in the signals shown in FIG. 12;

FIG. 15 is a block diagram of a sending system used in connection with the above embodiment;

FIG. 16 is a schematic diagram showing an example of the scanning procedure in the method of this invention;

FIGS. 17*a* and 17*b* show sampling positions in a conventional scanning procedure;

FIGS. 18*a* and 18*b* show sampling positions in the scanning procedure in accordance with the present invention;

FIG. 19 is a block diagram of sending system shown in connection with the signal transmission method of this invention;

FIG. 20 is a block diagram of a receiving system corresponding to the system of FIG. 19;

FIG. 21 shows various signals appearing respectively at the indicated points of the circuits shown in FIGS. 19 and 20;

FIG. 22 is a code conversion table used in connection with the explanation of the block diagram shown in FIG. 19;

FIG. 23 is a block diagram relating to another embodiment of this invention;

FIG. 24 shows various signals which are observed at the indicated points in the block diagram shown in FIG. 23;

FIG. 25 is a system diagram showing a transmission system used in connection with this invention;

FIG. 26 shows isometric views of signal generators;

FIGS. 27 and 28 are code conversion tables used for another embodiment;

FIG. 29 is a diagram referred to in the explanation of the system shown in FIG. 19;

FIG. 30 is a block diagram referred to in the explanation of the system shown in FIG. 19;

FIGS. 31, 32, 33, 34 and 35 show signals referred to in connection with the explanation of the block diagram shown in FIG. 30; and FIG. 36 is a block diagram referred to in connection with the explanation of the system shown in FIG. 25.

To begin with, explanation will be given in connection with a case where two signals $x$ and $y$ are transmitted in a form of a single signal $z$. It will be obvious from the sampling theory that signals $x$ and $y$ can be represented by respective sequences of sampled pulses having appropriate pulse intervals (Nyquist intervals) as said signals can be considered to have a certain frequency band in a limited time interval. Now, assume that four levels (that is, 2 bits) represented by 0, 1, 2 and 3 are sufficient for communicating information of the signals $x$ as well as $y$, though it is not generally required for the levels of the signals $x$ and $y$ to be identical.

FIGS. 1*a* and 1*b* show the changing amplitudes, that is, wave forms of the signals $x$ and $y$ and further the quantization (0 to 3) of the amplitudes at sampling positions. Quantized amplitude means into how many discrete parts an amplitude can be divided without losing the required information.

FIG. 2 is a table indicating amplitudes of the signal $z$ which are determined by values of $x$ and $y$ shown in FIGS. 1*a* and 1*b*. As is seen from FIG. 2, for example, $z$ is 6 if $x$ is 1 and $y$ is 1, and $z$ is 10 if $x$ is 2 and $y$ is 2. Inversely, $x$ is 1 and $y$ is 1 if $z$ is 6, and $x$ is 2 and $y$ is 2 if $z$ is 10. Thus, signals $x$ and $y$ are combined into a single signal $z$ which is represented by dots in FIG. 1*c*.

Therefore, it is only required that the signal $z$ be transmitted in lieu of two signals $x$ and $y$. And, if the transmission channel is sufficiently wide to allow discrimination of 16 levels in this example, it will be possible to reproduce the signals $x$ and $y$ from the signal $z$ at the receiving end. It will be noted that pulse intervals in the sampled signals $x$, $y$ and $z$ are identical and the necessary frequency band is made none the wider for the use of the signal $z$. Namely, the same frequency band will be required for the transmission of the signal $x$ only.

Though the above example describes the synthesis of one signal $z$ from two separate signals $x$ and $y$, it is possible to make one signal from three or more signals. For example, as is seen from the table shown in FIG. 3, three signals $x$, $y$ and $z$ can be substituted by a single signal $z'$. *A signal $z'$ such that, for example, $z'$ is* 1 if $x = 0$, $y = 0$, and $z = 0$, and $z'$ is 2 if $x = 1$, $y = 0$, and $z = 0$, is transmitted; and the transmitted signal $z'$ is separated to three original signals $x$, $y$ and $z$ at the receiving end.

In the first example, two signals $x$ and $y$ have been sampled with an identical interval. However, the sampling frequency of the signal $x$ can be a multiple of that of the signal $y$, for example. In that case, the signal $x$ is supposed to be a group of signals $x_1, x_2, x_3 \ldots\ldots x_n$ and the signal $z$ to be transmitted is determined by the signals $x_1, x_2, x_3 \ldots\ldots x_n$ and the signal $y$.

The probability with which errors will occur at the time of reproduction of two signals $x$ and $y$ from the transmitted signal $z$, is a function of the capacity of the transmission channel. When a particular channel capacity is given, it is necessary for values of $z$ which is a function of $x$ and $y$ to be selected so that variation in the value of $z$ caused by noise least affects values of $x$ and $y$. Thus, according to the present invention as shown in the drawings, the values of $z$ are determined such that two $z$ signal pulses which differ from each other by a value of 1 are derived, for example, from two sets of $x$, $y$ components in which only one component differs from its counterpart by a value of 1, while the other component and its counterpart have the same values.

Figure 4:
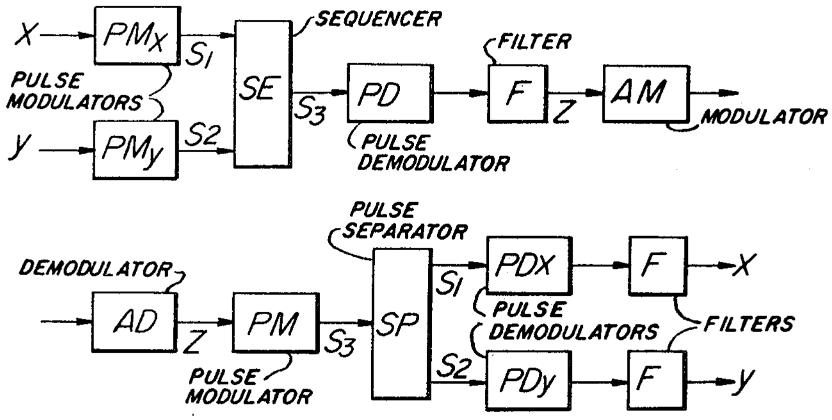
FIG. 4 shows block diagrams of sending and receiving systems used in connection with the above embodiment.

A system more tangibly embodying this invention is constituted as shown in FIG. 4, for example, using the technique of PCM (pulse code modulation).

Figure 5:
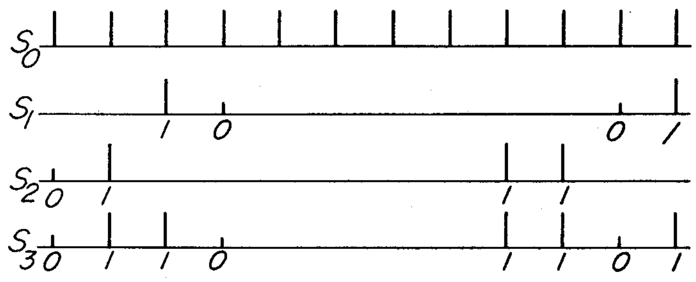
FIG. 5 shows signals appearing at the indicated points of the systems shown in FIG. 4.

Signals $x$ and $y$ are sampled and encoded through PCM modulating circuits $PM_x$ and $PM_y$ respectively, as shown by pulse sequences $S_1$ and $S_2$ in FIG. 5. The encoded signals $S_1$ and $S_2$ are combined into one signal $S_3$ in sequencer SE. ($S_0$ in FIG. 5 indicates the timing signal). Then, the signal $S_3$ is demodulated in demodulator PD and filtered through filter F to become the synthesized signal $z$, which is transmitted after being modulated in AM (or FM) modulator AM.

At the receiving end, the transmitted signal is demodulated to signal $z$ in demodulator AD. Signal $z$ is sampled and encoded to signal $S_3$ in PCM modulator PM and then separated to two signals $S_1$ and $S_2$ in separating circuit SP. The separated signals are demodulated respectively in PCM demodulators $PD_x$ and $PD_y$ and reconverted to the original signals $x$ and $y$ through filters F.

Next, this invention will be described in connection with another embodiment. Assuming that signal $x_1(t)$ has roughly a certain frequency band, it is known that this signal can be transmitted in the form of sampled signals taken at a constant interval T. It is also assumed that the signal $x_1$ can be sufficiently defined only by discrete or quantized amplitudes.

A wave form of such signal $x_1(t)$ is shown in FIG. 6*a* where the discrete amplitudes are identified by digits 0 – 5 and the signal is shown to be sampled at the interval T. Now, consider signal $\bar{z}_1$ which consists of $\bar{a}_i$ and $\bar{b}_i$, respectively representing signals at instants ($a_1$, $a_2$, $a_3$ .....) and ($b_1$, $b_2$, $b_3$ .....) respectively belonging to two groups of time $t_1$ and $t_2$, the amplitude $\bar{z}_1$ of which is unequivocally determined by $\bar{a}_i$ and $\bar{b}_i$, and inversely, from the amplitude $\bar{z}_1$ of which the amplitudes $\bar{a}_i$ and $\bar{b}_i$ are uniquely determined.

FIG. 7 shows the above-described relation of $\bar{z}_1 = f(\bar{a}_i, \bar{b}_i)$ in a table. For example, if $\bar{a}_i = 1$ and $\bar{b}_i = 1$, then $\bar{z}_1 = 7$; or if $\bar{a}_i = 2$ and $\bar{b}_i = 2$, then $\bar{z}_1 = 15$. Inversely, if $\bar{z}_1 = 7$, then $\bar{a}_i = 1$ and $\bar{b}_i = 1$; or if $\bar{z}_1 = 15$, then $\bar{a}_i = 2$ and $\bar{b}_i = 2$.

Thus, the signal shown in FIG. 6*a* is converted to the signal $z_1$ shown in FIG. 6*b*. It will be seen that though the latter signal has a discrete amplitude of 0 – 35, a value much higher than that of the former of 0 – 5, the sampling frequency in the latter is one half of that in the former. This shows that the signal $z_1$ having only one half the frequency of signal $x$, can transmit information as effectively as the signal $x$. Thus, the necessary frequency band of the transmission channel can be reduced by transmitting the signal $z_1$ in lieu of the signal $x_1$ and reproducing the signal $x_1$ at the receiving end.

FIGS. 8 and 9 describe an embodiment, by which the frequency band of the transmitted signal is reduced to one third of the original band.

Referring to FIG. 8*a* which shows the wave form of a signal $x_1$, assume that the signal can be sufficiently identified by an amplitude signal of one bit (0, 1). Now, compose signal $z_1$ such that the amplitude $\bar{z}_1$ of the signal is determined by the discrete amplitudes $\bar{a}_i$, $\bar{b}_i$ and $\bar{c}_i$ of the signal $x$ at the instants ($a_1$ $b_1$ $c_1$), ($a_2$ $b_2$ $c_2$) ..... respectively belonging to three groups of time $t_1$, $t_2$ and $t_3$, and inversely the amplitudes $\bar{a}_i$, $\bar{b}_i$ and $\bar{c}_i$ are uniquely determined if the amplitude $\bar{z}_1$ is given.

FIG. 9 shows the above-described relation of $\bar{z}_1 = f(\bar{a}_i \bar{b}_i \bar{c}_i)$ in a table. For example, if $\bar{a}_i = 1$, $\bar{b}_i = 0$ and $\bar{c}_i = 0$, then $\bar{z}_1 = 1$, or if $\bar{a}_i = 0$, $\bar{b}_i = 1$ and $\bar{c}_i = 0$, then $\bar{z}_1 = 3$. Inversely, if $\bar{z}_1 = 1$, then $\bar{a}_i = 1$, $\bar{b}_i = 0$ and $\bar{c}_i = 0$, or if $\bar{z}_1 = 3$, then $\bar{a}_i = 0$, $\bar{b}_i = 1$ and $\bar{c}_i = 0$.

Thus, the signal $x_1$ shown in FIG. 8*a* is converted to the signal $z_1$ shown in FIG. 8*b*. It will be seen that though the latter signal has a higher quantized amplitude of 0 – 7 than 0 – 1 of the former signal, the sampling frequency in the latter is one third of that in the former, indicating that the latter signal $z_1$ can be correctly reproduced though it occupies only one third of the frequency band of signal $x_1$. Therefore, the necessary frequency band of the transmission channel can be reduced by transmitting the signal $z_1$ in lieu of the signal $x_1$ and reproducing the signal $x_1$ at the receiving end.

In each of the above two examples, the same sampling frequency has been applied. However, different sampling intervals can be used, if desired, depending on the wave form of the original signal (as in the case of a video signal or facsimile signal which has the wave form of a particular feature).

A further tangible circuit used in connection with this invention, in which the PCM technique is used, is shown in FIG. 10. Assuming that signal $z_1$ whose amplitude $\bar{z}_1$ is determined by the quantized amplitudes $\bar{a}_i$ and $\bar{b}_i$ of the signal $x_1$ at instants $t_1$ and $t_2$, is to be transmitted, the signal $x_1$ is applied to PCM modulating circuit $PM_{a1}$ through delay circuit $DT_1$ which gives a delay corresponding to the sampling interval T, while the same signal $x_1$ is directly applied to PCM modulating circuit $PM_{b1}$, where the signal is sampled and encoded as seen by signals $S_{11}$ and $S_{21}$ shown in FIG. 11 to become coded signals $\overline{a}_i$ and $\overline{b}_i$. The coded signals $\overline{a}_i$ and $\overline{b}_i$ are combined into signal $S_{31}$ in sequencer SE. ($S_{01}$ in FIG. 11 indicates the timing signal.) Then, the signal $S_{31}$ is demodulated in PCM demodulator $PD_1$ and filtered through filter $F_1$ to become the synthesized signal $z_1$, which is transmitted after being (AM- or FM-) modulated in modulator $AM_1$.

At the receiving end, the transmitted signal is demodulated to signal $z_1$ in demodulator $AD_1$. Signal $z_1$ is sampled and encoded to signal $S_{31}$ in PCM modulator $PM_1$ and then separated to two signals $S_{11}$ and $S_{21}$ in separating circuit $SP_1$. The separated signals are demodulated respectively in PCM demodulators $PD_{a1}$ and $PD_{b1}$ and reconverted to the original signal $x$ through filter $F_1$.

Next, this invention will be explained relating to another embodiment, referring to FIGS. 12*a*, 12*b* and 12*c*, which for simplicity of the explanation, is a case where two signals $x_2$ and $y_2$ are transmitted in a form of a single signal $z_2$. It will be obvious from the sampling theory that signals $x_2$ and $y_2$ can be represented by respective sequences of sampling pulses having appropriate pulse intervals (Nyquist intervals) as said signals can be considered to have a certain frequency bands in a limited time interval. It is assumed in this example that four levels (that is, 2 bits) represented by 0, 1, 2 and 3 are sufficient for communicating information of the signals $x_2$ as well as $y_2$, though it is not required generally for the levels of the signals $x_2$ and $y_2$ to be identical.

FIGS. 12*a* and 12*b* show the varying amplitudes, that is, wave forms of the signals $x_2$ and $y_2$ as well as the quantization (0 to 3) of the amplitudes at sampling positions.

FIG. 13 is a table indicating amplitudes of the signal $z_2$ which are determined by values of $x_2$ and $y_2$. As is obvious from FIG. 13, for example, if $x_2 = 1$ and $y_2 = 1$, then $z_2 = 6$, or if $x_2 = 2$ and $y_2 = 2$, then $z_2 = 10$. Inversely, if $z_2 = 6$, then $x_2 = 1$ and $y_2 = 1$, or if $z_2 = 10$, then $x_2 = 2$ and $y_2 = 2$. Thus, signals $x_2$ and $y_2$ are combined into a single signal $z_2$ which is represented by dots in FIG. 12*c*.

Therefore, it is only required that the signal $z_2$ be transmitted in lieu of two signals $x_2$ and $y_2$. And, if the transmission channel is sufficiently wide to allow discrimination of sixteen levels in this example, it will be possible to reproduce the signals $x_2$ and $y_2$ from the signal $z_2$ at the receiving end. It will be noted that pulse intervals in the sampled signals $x_2$, $y_2$ and $z_2$ are identical and the necessary frequency band is made none the wider for the use of the signal $z_2$. Namely, the same frequency band will be required for the transmission of the signal $x_2$ only by a conventional transmission method.

It should be noted that signals $x_2$, $y_2$ and $z_2$ are sampled at an identical interval, and that it is important for the sampling frequencies at the sending end and at the receiving end to be synchronized. Therefore, it is necessary that a signal for the synchronization is sent from the sending end to the receiving end. For this reason, in the present embodiment, the blanking periods of the two signals $x_2$ and $y_2$ are made to coincide, and one portion of the blanking interval is utilized to send the synchronizing signal for sampling. At the receiving end, sampling signals which are in phase with those at the sending end are produced through an AFC circuit and other appropriate circuits on the basis of the periodically sent synchronizing signals mentioned above.

Though the above example describes the synthesis of one signal $z_2$ from two signals $x_2$ and $y_2$, it is possible to make one signal from three or more signals. For example, as is seen from the table shown in FIG. 14, three signals $x_2$, $y_2$ and $z'_2$ can be substituted by a single signal $z''_2$, $z''_2$ such that, for example, if $x_2 = 0$, $y_2 = 0$ and $z'_2 = 0$, then $z''_2 = 1$, or if $x_2 = 1$, $y_2 = 0$ and $z'_2 = 0$, then $z''_2 = 2$, is transmitted; and the transmitted signal $z''_2$ is separated to three original signals $x_2$, $y_2$ and $z'_2$ at the receiving end.

In the example previously described in connection with two signals $x_2$ and $y_2$, the signals have been sampled with an identical interval. It will be understood, however, that the sampling frequency of the signal $x_2$ can be a multiple of that of the signal $y_2$, for example. In that case, the signal $x_2$ is supposed to be a group of signals $x_{11}$, $x_{21}$, $x_{31}$ ..... $x_{n1}$ and the signal $z_2$ to be transmitted is determined by the signals $x_{11}$, $x_{21}$, $x_{31}$ ..... $x_{n1}$ and the signal $y_2$.

Probability with which errors will occur at the time of reproduction of two signals $x_2$ and $y_2$ from the transmitted signal $z_2$, is a function of the capacity of the transmission channel. When a particular channel capacity is given, it is necessary for values of $z_2$ which is a function of $x_2$ and $y_2$ to be selected so that variation in the value of $z_2$ caused by noise least affects values of $x_2$ and $y_2$.

Now, a system based on the above-described embodiment of this invention is constituted as shown in FIG. 15, for example, employing the technique of PCM.

Signals $x_2$ and $y_2$ are sampled and encoded through PCM modulating circuit $PM_{x2}$ and $PM_{y2}$ respectively. The thus coded signals are combined into one coded signal $S_{32}$ in sequencer $SE_2$. Then, the signal is demodulated in PCM demodulator $PD_2$ and filtered through filter $F_2$ to become the synthesized signal $z_2$. This signal $z_2$ has periodical blanking intervals into which are put the sampling signal $S_{02}$ used for the sampling of signals $x_2$ and $y_2$. The signal provided with the sampling signals in the blanking intervals is transmitted after being modulated in modulator $AM_2$.

Thus, according to this invention, if the quantized amplitudes of the signals obtained by sampling a group of signals $\alpha$, $\beta$, $\gamma$ ..... having blanking intervals of a predetermined frequency and phase with an identical sampling signal, are indicated by $\overline{a}_i$ ($i = 1, 2, 3, ..... l$), $\overline{\beta}_j$ ($j = 1, 2, 3 ..... m$) and $\overline{\gamma}_k$ ($k = 1, 2, 3 ..... n$), and if there is introduced a signal $z_2$ such that the amplitude of the signal $z_2$ is determined by amplitudes $\overline{\alpha}_i$, $\overline{\beta}_j$ and $\overline{\gamma}_k$ and inversely the latter amplitudes are uniquely determined by the amplitude of signal $z_2$, then it is possible to transmit such single signal $z_2$ in lieu of the group of signals $\alpha$, $\beta$, $\gamma$ ..... and further to transmit said sampling signal by putting it in the blanking interval of the signal $z_2$. The signal band reducing method of this invention which enables a channel band for a single signal to accommodate a plurality of signals having the substantially same frequency band, will be very useful for the transmission of facsimile signals and other similar signals through a wire.

In the above-described system, signals $x_2$, $y_2$ and $z_2$ are sampled at the same interval. It is important that the sampling frequencies at the sending and receiving ends are mutually synchronized. Therefore, it is necessary to send a signal from the sending end to the receiving end in order to synchronize the sampling signal. For this purpose, selected sampling signals are transmitted along with the information signal, and at the receiving end, the former signals are separated from the latter through a filter to be used as a reference signal at the receiving end. The sampling frequency is nearly two times as high as the maximum frequency of the information signals $x_2$ and $y_2$. It will be noted that information is generally very scarce in the vicinity of the maximum frequency. As a sampling frequency has substantially no frequency band, it is set at a frequency separable from the information signal at the vicinity of the maximum frequency.

In this case, as the sampling frequency is contained within the frequency band of the information signal, it is possible for the information signal to be affected by the residual of the filtered-out sampling signal. Therefore, it is required to minimize the visible effects of the sampling signal by selecting a particular frequency for sampling in the relation to the scanning period of the original two signals $x_2$ and $y_2$. For this reason, the sampling frequency is set at a number which is the product of one half of the above-mentioned scanning frequency multiplied by an odd number which is selected so as to make said sampling frequency nearly twice the maximum frequency of the original signals and lower than twice the band width of the transmission channel. By such arrangement, the effects of the sampling pulses to the information signals on two adjacent scanning lines are mutually cancelled, and become unnoticeable if the density of scanning lines is as high as 10 lines per mm.

Thus, according to this invention, the quantized amplitudes of the signals obtained by sampling a group of signals $\alpha$, $\beta$, $\gamma$ ..... obtained by the scanning of a predetermined cycle with an identical sampling signal, are indicated by $\bar{\alpha}_i$ ($i = 1, 2, 3$ ..... $l$), $\bar{\beta}_j$ ($j = 1, 2, 3$ ..... $m$) and $\bar{\gamma}_k$ ($k = 1, 2, 3$ ..... $m$), and if there is introduced such a signal $z_2$ that the amplitude of the signal $z_2$ is determined by amplitudes $\bar{\alpha}_i$, $\bar{\beta}_j$ and $\bar{\gamma}_k$ and inversely the latter amplitudes are uniquely determined by the amplitude of signal $z_2$, then it is possible to transmit such single signal $z_2$ in lieu of the group of signals $\alpha$, $\beta$, $\gamma$ ..... and further to transmit said sampling signal along with said information signal $z_2$, the frequency of said sampling signal being selected so as to correspond to a number which is nearly the product of one half of the scanning frequency multiplied by an odd number and to be approximately twice the maximum frequency of the information signals and less than twice the band width of the transmission channel, and the transmitted sampling signal being separated from the information signal to be used as reference signal at the receiving end. The signal band reducing method of this invention which enables a channel for a single signal to accommodate a plurality of signals, will be very useful for the transmission of facsimile signals or the like through a wire.

Next, the linearity of the reproduced signals at the receiving end will be discussed hereunder. Generally, deviations from linearity which may occur in the course of transmission of the PCM modulated signal, are especially conspicuous in facsimile. Reasons for this disfigurement will be explained. Referring to FIG. 16, a copy (A) of a manuscript to be transmitted is scanned in the direction *a*. A facsimile signal obtained by this scanning is pulse-modulated by sampling pulses, the position of which is indicated by markings B in FIG. 16.

If the pulse interval of the sampling signal B is not an exact division of the scanning period, the position of sampling relative to the image will regularly move after each scanning as shown in FIG. **17*a* which is an enlarged part of FIG. 16. Accordingly, the image reproduced from this sampling signal will have periodical indents as shown in FIG. 17*b***. Though these indents can be reduced if a closer sampling interval and/or a greater number of coded levels of amplitude are employed, it will make the signal band broader.

In order to maintain sufficient linearity without expanding the transmission channel, it is required that the sampling interval be selected to be an exact division of the scanning period. By this measure, an image having satisfactory linearity can be reproduced, since the positions of sampling in all scanning are aligned as shown in FIGS. **18*a* and 18*b***.

As described above, according to this invention, an image can be transmitted and reproduced with mutually well aligned scanning lines without the necessity of any additional frequency band for that purpose. Even when the signal which has been PAM or PCM modulated at the sending end is transmitted after being filtered through a low pass filter as is sometimes the case, the sampling signals are generally the same in frequency and phase at the sending and receiving ends. In such a case also, the sampling interval should be selected to be an exact division of the scanning period.

Now, a more tangible system based on this invention will be described referring to FIG. 19. In FIG. 19, reference numerals 1 and 2 indicate input terminals for signals I and II, 3 and 4 signal amplifiers connected to said input terminals 1 and 2 respectively, 5 and 6 wave form shaping circuits connected to outputs of said signal amplifiers 3 and 4 respectively, 7 a code conversion circuit for converting outputs of said shaping circuits 5 and 6, numeral 8 a code synthesizer for combining outputs of said code conversion circuit 7, numerals 9, 10 and 11 code delay circuits for correcting the wave forms provided between said code conversion circuit 7 and said code synthesizer, 12 a sampling pulse generator for supplying sampling pulses to said code conversion circuit 7, 13 a pulse delay circuit for delaying the output of said sampling pulse generator 12 and supplying said delayed pulse to said code synthesizer 8, 14 a low pass filter connected to the output of said code synthesizer 8, 15 a DC amplifier for amplifying the output from said low pass filter 14, 16 a ring modulator for modulating the output of a carrier oscillator 17 with the output from said DC amplifier, 18 a line amplifier for amplifying the output of said ring modulator 16, numeral 19 a VSB filter, 20 a channel filter, and 21 indicates an equalizer.

The input signals I and II are supposed to be facsimile signals which only contain signals narrower than a predetermined band width W and only have two levels 54 indicate the transmitters, the number of which is arbitrary. Assuming that two of these transmitters are now in operation, the information signals are produced in a mutual relation as shown in FIG. 26. In FIG. 26, reference numerals 61 and 62 indicate rotating drums, 63 and 64 blanking intervals, 65 and 66 sub-scanning mechanisms, and 59 and 60 photoelectric transducers. It will be seen that two drums are synchronized so that the blanking intervals are in coincidence, regardless of different starting of the scanning, that is, position of the sub-scanning. Returning to FIG. 25, reference numeral 55 indicates a quartz oscillator. The high output frequency of said oscillator is lowered by the frequency divider 56 to be used for the control of the transmitters 51, 52, 53 and 54. Numeral 56′ indicates a sampling pulse generator, 57 a processing circuit, and 58 a mixing circuit. A combination including the processing circuit 57, mixing circuit 58 and sampling pulse generator is equivalent to the circuits shown in FIG. 19.

Output from the mixing circuit 58 is transmitted to the receiving system through a line. In the receiving side, numerals 67, 68, 69 and 70 are receivers respectively associated with the transmitters 51, 52, 53 and 54 in the sending system, 71 a separator for separating the synchronizing signal from the transmitted signal, 72 a processing circuit for processing the output from the separator 71, numeral 73 a sampling pulse generator, 74 a selecting circuit, 75 a high frequency quartz oscillator, and 76 a frequency divider.

The sampling pulses in the sending and receiving systems are synchronized with outputs from the quartz oscillators 55 and 75, that is, with the main scanning cycle. As the sampling pulse in the receiving system is required to be in synchronization with that in the sending system, it is arranged so that a signal corresponding to the sampling pulse is put in the blanking interval of the information signal and transmitted to the receiving system and keeps the receiving system synchronized till the next blanking time. The transmitters at a sending end are all synchronized in both speed and phase of the rotation so that the blanking intervals of all transmitters mutually coincide regardless of their respective starting times.

As is seen from FIG. 25, the sampling pulse transmitted to the receiver is produced by dividing the output of the quartz oscillator 55 in the transmission system. Assuming that ratio of the divided frequency to the original frequency is $1/n$, the difference in phase between the transmitted sampling pulse and a corresponding pulse produced in the receiving system can be less than $1/2n$ of the pulse interval by selecting the nearest one out of the possible $n$ series of pulses in different phases.

Further, absolute error and drift of the frequencies of the quartz oscillators in the sending and receiving system is corrected once in every scanning cycle by the transmitted sampling pulse inserted in the blanking interval. Therefore, the correction is required only for possible errors during one scanning cycle. Though it is desirable that the oscillators have somewhat higher accuracy than the commonly used ones, it will be understood that the requirement is not beyond the present technical level. It has been verified by an actual test that the above-described system is a very practical one.

By the synchronization of the main scanning cycle and the sampling pulse, the sampling position invariably comes on a straight line parallel to the blanking, regardless of position of sub-scanning. As a result, an image containing many horizontal or vertical lines (relative to the blanking) can be clearly transcribed with minimum sampling noise. This will be understood by considering what would be reproduced from a straight line on a manuscript if the sampling position was taken at random on the manuscript for each main scanning.

In the above description, an example involving two input signals has been explained. If three input signals are involved, the code conversion table should contain eight levels as shown in FIG. 27, in which A, B and C indicate input signals and D indicates output signal. Codes of two signals which require three levels for indication of the amplitude are converted according to the table shown in FIG. 28, in which A and B indicate the input signals and the numerals in the largest frame are the output signals.

Further, the method of this invention which is directed to transmission of wave forms, is required to transmit at least the sampling point with considerably high fidelity. Various means to ensure this fidelity are provided in actual systems. For example, code delay and synthesis means is employed to eliminate a reflection phase delay distortion or the like caused in the filter or other channel components, by joining, either before or after transmission, several channels or psuedo-reflection signals obtained by arbitrarily delaying the information signals. Test results on the above means was satisfactory more than expected. Further, in order to eliminate transient levels caused by the fact that the filters do not have the ideal characters, a method for correcting amplitude of the adjacent pulse in the code synthesizer are now under investigation. According to the just mentioned method, a monitoring receiver whose construction is fundamentally similar to that shown in FIG. 20, is provided at the sending end to correct errors originated in the local system. This method of correction by comparison of outputs is expected also to be effective in actual use.

Next, the functions of the code delay circuit 9, 10 and 11 shown in FIG. 19 will be explained referring to FIGS. 30, 31, 32, 33, 34 and 35.

Generally speaking, as for a signal of finite energy, that is, a signal of $f(t)$ which satisfies equation (1), the relation between the signal $f(t)$ and its Fourier conversion $F(\omega)$ is expressed by equations (2) and (3).

$$\int_{-\infty}^{\infty} \left| f(t) \right|^2 dt < +\infty \qquad (1)$$

$$f(t) = \frac{1}{2\pi} \int_{-\infty}^{\infty} F(\omega)\, \epsilon^{j\omega t} d\omega \qquad (2)$$

$$F(\omega) = \int_{-\infty}^{\infty} f(t)\, \epsilon^{-j\omega t} d\omega \qquad (3)$$

From these equations, if a signal whose Fourier conversion is $F_{(\omega)}$ is transmitted through a channel having a characteristics of $T_{(\omega)}$, the output signal $G_{(t)}$ is expressed by the following equation (4).

$$G_{(t)} = \frac{1}{2\pi} \int_{-\infty}^{\infty} F(\omega) \cdot T(\omega)\, \epsilon^{j\omega t} d\omega \qquad (4)$$

corresponding to 0 and 1, or on and off. These signals I and II are amplified in the signal amplifiers 3 and 4 and then shaped to signals $S_1$ and $S_2$ as shown in FIG. 21 in the wave form shaping circuits 5 and 6. The signals $S_1$ and $S_2$ are fed to the code conversion circuit 7 and converted to signals $S_3$, $S_4$ and $S_5$ by being sampled by the output of the sampling pulse generator 12. That is, pulse $S_3$ corresponds to (1, 1) of signals $S_1$ and $S_2$, $S_4$ (1, 0) of $S_1$ and $S_2$, and $S_5$ to (0, 1) of $S_1$ and $S_2$. This conversion is carried out according to a rule shown by the table of FIG. 22. That is, pulse $S_3$, $S_4$ or $S_5$ is produced corresponding to (1, 2 or 3) determined by the combination of pulse levels of signals $S_1$ and $S_2$ upon each occurrence of the sampling pulse. It will be noted that the pulse interval of the sampling pulse corresponds to the Nyquist period of the signals I and II.

The code delay circuits 9, 10 and 11 which are used for correction of the wave forms will be explained later. The pulse delay circuit 13 also will be described in the latter part of this specification. In principle, the output $S_6$ of the code synthesizer 8 can be considered as being directly synthesized from the signals $S_3$, $S_4$ and $S_5$. As shown in FIG. 21, the existence of a pulse on $S_3$, $S_4$ or $S_5$ at each sampling instant corresponds respectively to a pulse on level 3, 2 or 1 of the pulse sequence $S_6$. Level 0 of $S_6$ corresponds to no input pulse. Thus, two signals I and II can be combined into a single signal $S_6$. The frequency component included in $S_6$, being a Nyquist period ½W, is the same as the signals I and II. Therefore, the signals I and II can be transmitted concurrently through a transmission channel which has a frequency band of no more than W. However, signal $S_6$ contains four levels of 0, 1, 2 and 3, whereas the signals I and II include only two levels of 0 and 1. Therefore, deterioration of the signal-noise ratio should be taken into consideration.

In the method of this invention, it is intended to compensate for the inferior signal-noise ratio by the advantages in the frequency band. It will be noted, however, that a noise ratio lower than a limited level will not affect the transmission of the signal according to this invention, as the signals are processed in the form of pulses. This signal $S_6$ is converted to signal $S_8$ as shown in FIG. 21 through the low pass filter 14. The filter 14 is only required to be a low pass filter having the cutoff frequency W. In this case, the amplitude of the output from the filter is determined only by the height of pulse at every pulse interval of ½W, the adjacent pulses becoming zero at that point. This relation is shown in FIG. 29, in which reference numeral 22 indicates an ideal low pass filter, 23 an input pulse and 24 the output. Therefore, if this output is transmitted after being modulated in the modulator 16, the signal $S_8$ having the same wave form as that of the output from the low pass filter 14, is reproduced after demodulation at the receiving side. And, a sequence of pulses having intervals of ½W which is the same as that of the sampling position, is obtained at the receiving end.

The signal modulated in the modulator 16 is fed to the VSB filter 19 through the line amplifier 18 for high density transmission in narrow band. An actual transmission channel further includes various filters, equalizers and other components which obstructs unaffected transmission of a wave form. Therefore, the channel filter 20 has been introduced to this embodiment on the basis of a field test.

Next, a receiving system will be described referring to the block diagram shown in FIG. 20. Reference numeral 25 indicates an input terminal, 26 a VSB filter connected to said input terminal, 27 an equalizer connected to the output of the VSB filter, 28 a line amplifier for amplifying the output from the equalizer 27, numeral 29 a demodulator, 30 a low pass filter for filtering the output from the demodulator 29, numerals 31, 32 and 33 level comparators, 34 a sampling pulse generator, 35 a code conversion circuit for converting the output of the level comparators 31, 32 and 33, numerals 36 and 37 signal amplifiers for amplifying the respective output of the code conversion circuit 35 and numerals 38 and 39 indicate terminals for connecting receivers.

The input signal received by terminal 25 is demodulated in the demodulator 29 and filtered through the low pass filter 30 to become signal $S_8$ shown in FIG. 21. The signal $S_8$ is compared as to the level in the level comparators 31, 32 and 33 using the sampling pulse which is in phase with that in the sending side, thereby being converted to signals $S_9$, $S_{10}$ and $S_{11}$ which correspond to the signals $S_3$, $S_4$ and $S_5$ respectively, and then fed to the code conversion circuit 35, where the signal is processed in a reversed manner as in the sending system to be separated into two signals $S_{12}$ and $S_{13}$. It will be understood that an error less than the sampling interval ½W should be permitted. This will be understood more clearly by comparing signals $S_1$ and $S_2$ with $S_{12}$ and $S_{13}$. In practical use, however, this error is hardly a problem as it is sufficiently small in relation to the signals $S_1$ and $S_2$.

In the just-described embodiment, the frequencies of two input signals have been assumed to be lower than W. Now, transmission of a signal having a frequency up to 2W through the same transmission channel will be explained. It will be understood that the pulse interval of the sampling signal must be ¼W in this case. FIG. 23 shows additional circuits used in connection with this particular embodiment, and FIG. 24 shows signals related to the operation of the circuits in FIG. 23.

In FIG. 23, reference numeral 40 indicates an input terminal for the signal III, 41 a signal amplifier, 42 a wave form shaping circuit, 43 and 44 sampling circuits, 45 a sampling pulse generator, 46 a code delay circuit connected to said sampling circuit 44, and numeral 47 a pulse frequency halving circuit connected to said sampling pulse generator 45. Signals at output terminals 48 and 49 are equivalent to the sampled signals in the code conversion circuit 7 in FIG. 19.

The signal III is amplified in the amplifier 41, shaped through the wave form shaping circuit 42 as shown by signal $S_{14}$ in FIG. 24, and sampled by the pulse $S_{15}$ to become such signals as $S_{16}$ and $S_{17}$. The signal $S_{17}$ is delayed through the code delay circuit 46 so as to coincide with signal $S_{16}$ in the position of pulse, as shown by $S_{18}$ in FIG. 24. The signals $S_{16}$ and $S_{18}$ are converted in the same manner as described in connection with FIG. 19 to become the synthesized signal $S_{19}$. Thus, by adding the circuits shown in FIG. 23 to the circuits shown in FIG. 19, a signal having a frequency up to 2W cam be transmitted through a channel for a frequency lower than W.

Next, a transmission system based on the above embodiment of this invention will be described referring to FIGS. 25 and 26. Reference numerals 51, 52, 53 and In an ideal transmission line, $T_{(\omega)}$ is expressed by the following equation (5).

$$T_{(\omega)} = A\epsilon^{-j\omega\tau} \quad (5)$$

where $a$ and $\pi$ are constants.

Then, the output signal $g_{(t)}$ is expressed by equation (6), ensuring transmission of exact wave forms.

$$g(t) = Af(t-\tau) \quad (6)$$

However, when phase characteristics $P_{(\omega)}$ of the transmission system, if there is any phase distorsion, is assumed to be expressed by equation (7) (where P and K indicate constants), and applicable terms in the equation (4) are substituted by the equation (7), the output signal $G_{(t)}$ is expressed by equation (8) using the equation (6) indicating the distortionless output $g_{(t)}$ $$P_\omega = -\tau_\omega + p \sin K_\omega \quad (7)$$

$$G(t) = J_0(P)\cdot g(t) + J_1(P)\cdot g(t+K) - J_1(P)\cdot g(t-K) \quad (8)$$

where $J_0(P)$ and $J_1(P)$ are first class Bessel functions.

Formulas used in the course of introduction of the equation (8) include Jacobi's formula (9) and formula (10) and further the formula for omission of terms of higher orders applicable for smaller values of $x$ in the equation (9).

$$\epsilon^{jx\sin\theta} = \sum_{k=-\infty}^{\infty} J_k(x)\,\epsilon^{jk\theta} = J_0(x) + J_1(x)\,\epsilon^{j\theta} + J_{-1}(x)\,\epsilon^{-j\theta} \quad (9)$$

$$J_{-K}(x) = (-1)^K J_K(x) \quad (10)$$

The first term of the equation (8) indicates the response in a distortionless transmission channel, that is, arrival of a wave form similar to the input after a delay time of $\tau$, and the second and third terms represent distortion components. These terms can be considered as a pair of echoes which appear a certain time K before and after the arrival of the wave of the first term. This relation is shown in FIG. 31, in which $a$ indicates the input signal and $b$ the output signal.

Therefore, in order to transmit a signal without distortion, it is only required that the pair of echoes (A and B in FIG. 31) be eliminated. This elimination is achieved by giving the input signal artificial echoes before the transmission so as to cancel the above-mentioned echoes.

Assuming that intensity of the echo at the output end is one half of that of the distortionless component, a pair of artificial echoes as shown in FIG. 32 is given to the signal in the sending system. This makes the output of the receiving system as shown in FIG. 33. If a further pair of artificial echoes is given to the signal at the sending system as shown in FIG. 34, the output of the receiving system will become as shown in FIG. 35. By such measures, the transmission of exact wave forms is achieved, ratio of the intensity of distortionless output and the echo being reduced to 3 : 0.25, whereas the ratio is 2 : 1 without such measures.

A block diagram of a device based on the above-described concept is shown in FIG. 30, in which reference numeral 77 indicates a pulse generator, 78 a low pass filter, 79 a delay circuit, 80, 81, 82, 83 and 84 differential amplifiers connected in parallel to the delay circuit 79, numeral 85 a modulator, 86 an output terminal of the sending system, 87 the transmission line, 88 an input terminal of the receiving system, 89 an amplifier, and 90 an envelope detector. Thus, by transmitting a pulse signal with delayed components of the same pulse added thereto, thereby correcting distortions caused to the original pulse signal in the course of the transmission, pulse transmission through a commercial telephone line can be realized with no substantial phasic distortion. The delay circuits 9, 10 and 11 in FIG. 19 are provided for this purpose.

Next, phase adjustment of the sampling pulse originating from the quartz oscillators 55 and 75 shown in FIG. 25 will be explained hereunder referring to FIG. 36.

In the PCM communication within a local network, the sampling pulses in the sending and receiving systems can be brought in mutually exact phase by employing a common oscillator. However, for a communication between places of different power frequencies of for a case where the synchronization is impossible because of distortion in the transmission channel, separate oscillators must be provided in both sending and receiving systems. In this case, the oscillation frequency and stability of the oscillators in the sending and receiving systems should be exactly the same or at least of minimum difference. In order that a facsimile communication by PCM system is practical in any mean, the above-mentioned minimum difference in the frequency and stability should be approximately $1 \times 10^{-9}$. An oscillator of such high accuracy is hardly available.

In view of this difficulty, a device which does not require such an accurate oscillator has been developed as shown in FIG. 36, in which marking X indicates a sending system, Y a receiving system and Z a transmission line. In the sending system X, numeral 91 indicates a signal input terminal, 92 a signal switching circuit, 93 a sampling circuit, 94 a modulator-amplifier, 95 an output terminal, 96 a drum phase detector, 97 a drum phase signal generator, and 98 a sampling pulse generator.

In the receiving system Y, numeral 99 indicates an input terminal, 100 an amplifier-detector, 101 a sampling circuit, 102 information signal amplifier, 103 an output terminal, 104 a gate circuit, 105 a counting circuit, 106 a distribution circuit, 107 a drum phase detector, 108 a drum phase signal generator, and 109 a sampling pulse generator.

In the sending system, a drum phase signal generated in the drum phase signal generator 97 on the basis of signal from the drum phase detector 96 is fed to the signal switching circuit which switches the system to the drum phase signal from the normally connected information signal, thus connecting the drum phase signal to the sampling circuit 93. While the drum phase signal is being fed to the sampling circuit 93, periodic pulses corresponding to an exact division of the period (pulse interval) of the sampling pulse are generated in the sampling circuit 93 and transmitted to the sending system.

In the sending system, the transmitted pulses are applied to the gate circuit 104 which feeds the pulses to the counting circuit 105 while the drum phase signal is being supplied from the drum phase detector 107 in the receiving system. The counting circuit 105 functions to discriminate the signal from noise, and if the circuit 105 detects the signal, it generates pulses which are fed to the distribution circuit 106. The distribution circuit 106 is set by the pulse from the counting circuit 105; and from the instant of said setting which defines the first sampling position, the sampling pulses are repeatedly generated in response to the signal from the sampling pulse generator. The output of the sampling pulse generator is plural sets of sampling pulses in different phases obtained by dividing a higher frequency from an oscillator. Out of the plural sets of sampling pulses, the one nearest in phase to the pulse received from the sending system is selected as the actual sampling pulse. The timing of repetition of the sampling pulse is maintained until arrival of the next drum phase signal.

Since the timing of the sampling pulse is corrected once in every rotation of the drum as described above, the oscillators are not required to be extremely accurate. For example, accuracy of about $1 \times 10^{-5}$ is sufficient for practical purposes, whereas about $1 \times 10^{-9}$ is the required accuracy if the just-described device is not used.

As described above, according to this invention, a signal can be transmitted through a narrower channel than the band width of the signal. This effect is expected to bring about important improvements in various fields of signal transmission.

What is claimed is:

1. A signal processing method comprising the steps of sampling an input signal at predetermined intervals to produce a succession of pulses, quantizing the amplitude of each pulse, combining every predetermined number of successive quantized pulses into a group of pulses in the sampled order, combining the quantized pulses in each group into a single pulse such that a quantized amplitude of the single pulse is uniquely determined from the quantized amplitude of each component pulse and the sampled order thereof in the group the quantized amplitude of each component pulse can be uniquely determined from the quantized amplitude of the single pulse and such that between two groups of quantized pulses which are respectively combined into two single pulses which differ from each other in quantized amplitude by one level, there exists only one component pulse which differs from its counterpart pulse in said group by only one level, the other component pulses and counterparts having the same amplitude level, and converting a succession of the single pulses into an amplitude-modulated signal through a low-pass filter.

2. A signal processing method as defined in claim 1, further comprising the steps of scanning a target to obtain said input signal, wherein the pulse interval of said sampling pulse is set at an exact division of the period of said scanning.

3. A signal processing method comprising the steps of respectively sampling a plurality of input signals at predetermined intervals to produce successions of pulses, quantizing the amplitude of each sampled pulse, combining said plurality of sampled pulses into a group of pulses in predetermined order, combining the quantized pulses in each group into a single pulse such that a quantized amplitude of the single pulse is uniquely determined from the quantized amplitude of each component pulse and the order thereof in the group and the quantized amplitude of each component pulse can be uniquely determined from the quantized amplitude of the single pulse and such that between two groups of quantized pulses which are respectively combined into two single pulses which differ from each other in quantized amplitude by one level, there exists only one component pulse which differs from its counterpart pulse in said group by only one level, the other component pulses and counterparts having the same amplitude level, and converting a succession of single pulses into an amplitude-modulated signal through a low-pass filter.

4. A signal processing method as defined in claim 3, further comprising the steps of scanning a target to obtain one of said input signals, wherein the pulse interval of said sampling pulse is set at an exact division of the period of said scanning.

5. A signal processing method as defined in claim 3, further comprising the steps of scanning a target to obtain said input signal, and determining the position of the sampling pulse for sampling said input signal in relation to the timing of said scanning.

6. A signal processing method as defined in claim 5, further comprising the step of selecting a frequency of said sampling pulse to correspond to one half the product of the scanning frequency multiplied by an odd number, such that said product is in the range of from approximately two times as high as the maximum frequency of said input signals to approximately two times as high as the bank width of a transmission channel for said processed signal.

7. A signal processing method as defined in claim 5, further comprising the steps of causing the blanking periods of said input signals to substantially coincide with one another, and transmitting a synchronizing signal for said sampling pulse during said blanking period.

8. A signal transmission method as defined in claim 7, further comprising the steps of dividing a reference frequency which is substantially common to both sending and receiving systems of said signal processing method by a number *n* (an integer) to obtain said synchronizing signal which is transmitted from said sending system to said receiving system; and selecting one pulse out of said number of said sampling pulses different in phase obtained by dividing said reference frequency by said number *n*, said selection being made with reference to said transmitted signal to be used as a timing reference in the said receiving system; and renewing said selection of one pulse upon every arrival of said transmitted signal.

9. A signal transmission method characterized in sampling a signal having frequency band not broader than 2W and samplable by *p* (an integer number) quantum levels, with sampling pulses having pulse intervals of ¼W, separating the sampled signal into two sets of pulse sequences taken at every other sampling point, delaying at least one set of said two pulse sequences to cause the pulses in said two pulse sequences to coincide, converting said two pulse sequences to a signal having pulse intervals of ½W and a quantized amplitude of $p^2$, and transmitting said converted signal after modulation.

* * * * *